(12) United States Patent
Ike

(10) Patent No.: US 7,391,462 B2
(45) Date of Patent: Jun. 24, 2008

(54) LENS DRIVING METHOD FOR IMAGING DEVICE, IMAGING DEVICE AND CAMERA SYSTEM

(75) Inventor: Takahiro Ike, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 636 days.

(21) Appl. No.: 10/214,276

(22) Filed: Aug. 7, 2002

(65) Prior Publication Data

US 2003/0030735 A1    Feb. 13, 2003

(30) Foreign Application Priority Data

Aug. 9, 2001    (JP) .......................... P. 2001-242321

(51) Int. Cl.
  *H04N 5/232*    (2006.01)
(52) U.S. Cl. ...................................... 348/347
(58) Field of Classification Search ................. 348/345, 348/347, 211.4, 211.6, 211.7, 211.9, 240.99
See application file for complete search history.

(56) References Cited

U.S. PATENT DOCUMENTS

| | | | |
|---|---|---|---|
| 5,352,882 A | 10/1994 | Koyanagi et al. | |
| 5,742,435 A | 4/1998 | Nagashima et al. | |
| 5,815,203 A * | 9/1998 | Lee et al. | 348/240.3 |
| 5,854,711 A | 12/1998 | Kaneda | |
| 6,046,863 A | 4/2000 | Chino | |
| 6,169,578 B1 * | 1/2001 | Chigira | 348/347 |
| 6,184,932 B1 * | 2/2001 | Tanaka | 348/347 |
| 6,864,910 B1 * | 3/2005 | Ogino et al. | 348/42 |
| 7,249,317 B1 * | 7/2007 | Nakagawa et al. | 715/515 |
| 2001/0048479 A1 * | 12/2001 | Ohkawara et al. | 348/360 |
| 2003/0128288 A1 * | 7/2003 | Kawamura et al. | 348/335 |

FOREIGN PATENT DOCUMENTS

| | | |
|---|---|---|
| EP | 0 560 646 A1 | 9/1993 |
| EP | 0 564 351 A2 | 10/1993 |
| JP | 06-205260 | 7/1994 |

* cited by examiner

*Primary Examiner*—Lin Ye
*Assistant Examiner*—Nicholas G Giles
(74) *Attorney, Agent, or Firm*—Pearne & Gordon LLP

(57) ABSTRACT

When an object image at a preset position is zoomed in at a target magnification by a zoom lens, the focus point position N of the object image at the zoom position Z1 of the target magnification is calculated. In addition, the mutual relation value (interior division ratio x:y) between the tracking curve I, II and the focus point position is calculated and the position or the focus lens is controlled so that the mutual relation value is kept with respect to the tracking curve when zoom-in is carried out. Accordingly, an object image in focus can be picked up at all times even during zooming.

6 Claims, 5 Drawing Sheets

TRACKING CURVE

LENS DRIVING METHOD FOR IMAGING DEVICE, IMAGING DEVICE AND CAMERA SYSTEM

BACKGROUND OF THE INVENTION

The present invention relates to an imaging device for use in a monitoring camera system or the like, and particularly to a lens driving method for an imaging device, an imaging device and a camera system that are suitable to pick up a zoom-in image of an object while bringing the object into focus (point).

An imaging device such as a monitoring camera system or the like is equipped with a zoom-in mechanism to make it possible to pick up a zoom-in image of a prescribed window when the window is targeted as an object to be monitored. FIG. 5 is a diagram showing an example of a tracking curve of a camera lens. As shown in FIG. 5, the tracking curve inherent to the lens contains two tracking curves, one tracking curve I focusing on a short-distance (1.6 m) point and the other tracking curve II focusing on a point at infinity.

Both the tracking curves are substantially coincident with each other when the zoom magnification is not high, and a focus lens is moved along any one of the tracking curves in conformity with the zooming of a zoom lens, whereby the zooming can be performed under the state that the focusing is established at all times. However, as the magnification of the zoom lens is raised, the gap between both the curves is larger, and the focus lens position at which the focusing is actually established is coincident with any position between both the curves.

Therefore, according to the conventional zoom mechanism, when a zoom magnification is determined, the zoom lens is moved to the position corresponding to the zoom magnification concerned at a stroke until the zoom magnification concerned is achieved. Further, the focus lens is moved along the tracking curve I in conformity with the movement of the zoom lens so as to reach a K-point position of FIG. 5, and then the focus lens is further moved to the focus position N by using an autofocusing technique or the like.

The imaging device for use in the conventional monitoring camera system or the like can achieve a zoom-in image of an object at high speed. However, there is a problem that the image of the object under zoom is blurred and it is impossible to carry out the monitoring based on clear images until the focusing operation is completed after the zooming operation.

SUMMARY OF THE INVENTION

An object of the present invention is to provide an imaging device, a lens driving method therefor and a camera system that can pick up an object image in focus even during zoom operation.

In order to attain the above object, a lens driving method for an imaging device is characterized in that when an object image located at a preset position is subjected to a zoom operation by a zoom lens, a focus lens is positionally controlled interlockingly with the zoom operation so that the object image in focus can be picked up even in the midst of the zoom operation.

Accordingly, the object image in focus can be displayed on a monitor even during the zoom operation. Further, the lens moving speed can be increased and the total moving amount of the focus lens can be reduced.

In order to attain the above object, a lens driving method for an imaging device is characterized in that when an object image located at a preset position is zoomed up at a target magnification by a zoom lens, the focus point position of the object image at the zoom position of the target magnification is determined, the mutual relation value between a tracking curve and the focus point position is determined, and a focus lens is positionally controlled so that the mutual relation value is kept with respect to the tracking curve when the zoom-in is carried out.

Accordingly, the object image in focus can be displayed on a monitor even during the zoom-in operation. Further, the lens moving speed can be increased and the total moving amount of the focus lens can be reduced.

In order to attain the above object, a lens driving method for an imaging device is characterized in that when an object image located at a preset position is zoomed in a wide direction by a zoom lens, the mutual relation value between the focus point position of the object image and a tracking curve is determined, and a focus lens is positionally controlled so that the mutual relation value is kept with respect to the tracking curve when the zoom is carried out.

Accordingly, the object image in focus can be displayed on a monitor even during the zoom operation in a wide direction. Further, the lens moving speed can be increased and the total moving amount of the focus lens can be reduced.

In order to attain the above object, an imaging device is characterized by comprising a camera lens having a zoom lens and a focus lens, and controller for positionally controlling the focus lens interlockingly with a zoom operation so that an object image in focus is picked up even in the midst of the zoom operation when the object image is subjected to the zoom operation by the zoom lens.

Accordingly, the object image in focus can be displayed on a monitor even during the zoom operation. Further, the lens moving speed can be increased and the total moving amount of the focus lens can be reduced.

In order to attain the above object, an imaging device is characterized by comprising a camera lens having a zoom lens and a focus lens, and controller for determining the focus point position of an object image at a zoom position of a target magnification and determining the mutual relation value between a tracking curve and the focus point position when the object image located at a preset position is zoomed up at the target magnification by said zoom lens, and also positionally controlling the focus lens so that the mutual relation value is kept with respect to the tracking curve when the zoom-in is carried out.

Accordingly, the object image in focus can be displayed on a monitor even during the zoom-in operation. Further, the lens moving speed can be increased and the total moving amount of the focus lens can be reduced.

In order to attain the above object, an imaging device is characterized by comprising a camera lens having a zoom lens and a focus lens, and controller for determining the mutual relation value between the focus point position of an object and a tracking curve when the object image located at a preset position is zoomed in a wide direction by the zoom lens, and positionally controlling the focus lens so that the mutual relation value is kept with respect to the tracking curve when the zoom is carried out.

Accordingly, the object image in focus can be displayed on a monitor even during the zoom operation in a wide direction. Further, the lens moving speed can be increased and the total moving amount of the focus lens can be reduced.

In order to attain the above object, a camera system is characterized by comprising a fixed imaging device as described above, a monitor for displaying an image from the camera lens, and a controller connected to said imaging device, the controller outputting an instruction of a zoom operation to the imaging device upon input of the zoom operation.

Accordingly, the object image in focus can be picked up and displayed on a monitor even during the zoom operation based on an instruction from the controller. Further, the lens moving speed can be increased and the total moving amount of the focus lens can be reduced.

DETAILED DESCRIPTION OF THE PREFERRED EMBODIMENT

An embodiment according to the present invention will be described with reference to the drawings.

Figure 2:
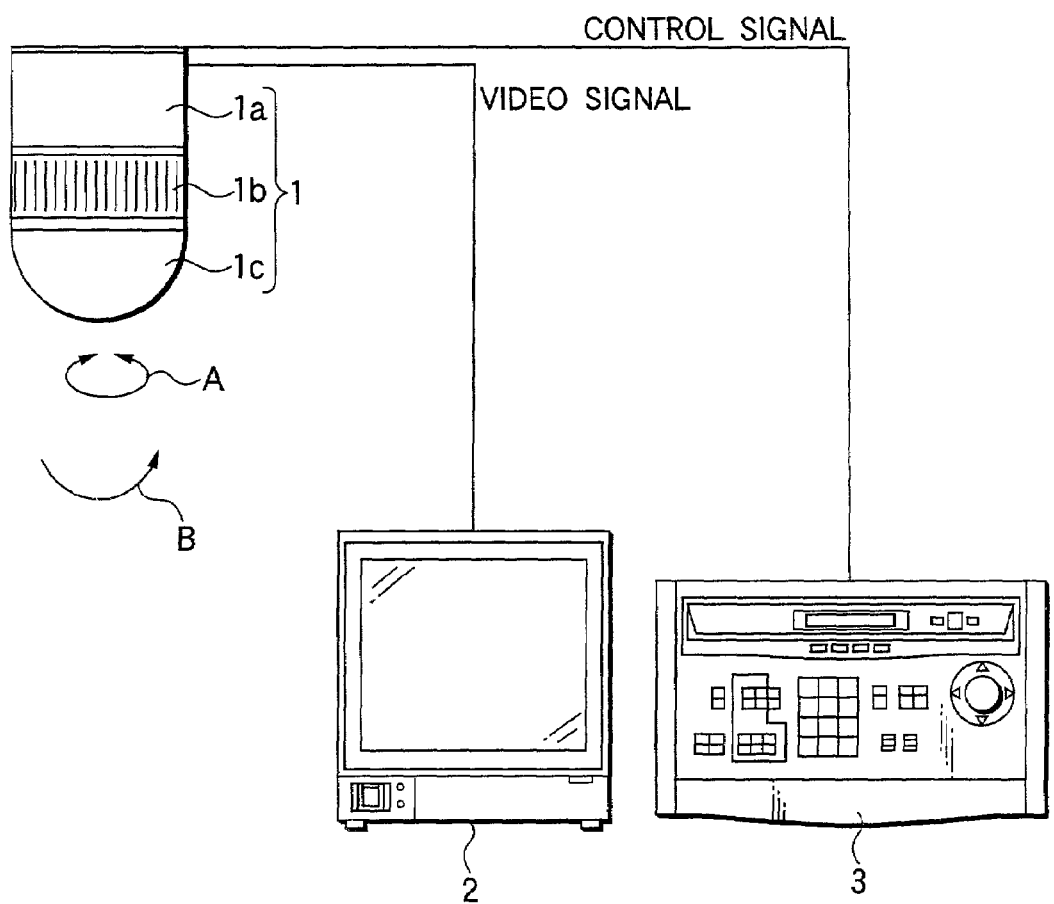
FIG. 2 is a diagram showing the construction of a monitoring camera system to which the imaging device of the present invention is applied.

FIG. 2 is a diagram showing the construction of a monitoring camera system to which an imaging device according to an embodiment of the present invention is applied. The monitoring camera system includes a camera (imaging device) 1 mounted on a ceiling or the like, a monitor 2 for displaying an image from the camera 1 on a screen, and a controller 3 for controlling the camera 1 from a remote place.

The camera 1 is equipped with a fixed mount 1a fixed on the ceiling, a rotatable mount (a pan mechanism for the camera 1) 1b which is freely rotatably secured to the fixed mount 1a, a camera lens system (reference numeral 10 of FIG. 3) described later which is mounted in a semi-spherical case 1c integrally-fixed to the rotatable mount 1b, and a tilt mechanism (not shown) for controlling the depression-angle direction of the camera lens over the direction of an arrow B.

The monitor 2 takes in a video signal from an image pickup element (reference numeral 20 of FIG. 3) like CCD mounted at the focus position of the camera lens, and displays it on a screen. The controller 3 has a front panel equipped with various buttons 3a, etc. through which manual operation instructions of a surveillant are input, and each operation instruction is output to the camera 1 to carry out a pan operation, a tilt operation and a zoom operation on the camera 1. Further, by pushing a memory button, the pan, tilt, zoom and focus positions of the camera are stored in a camera controller.

Figure 3:
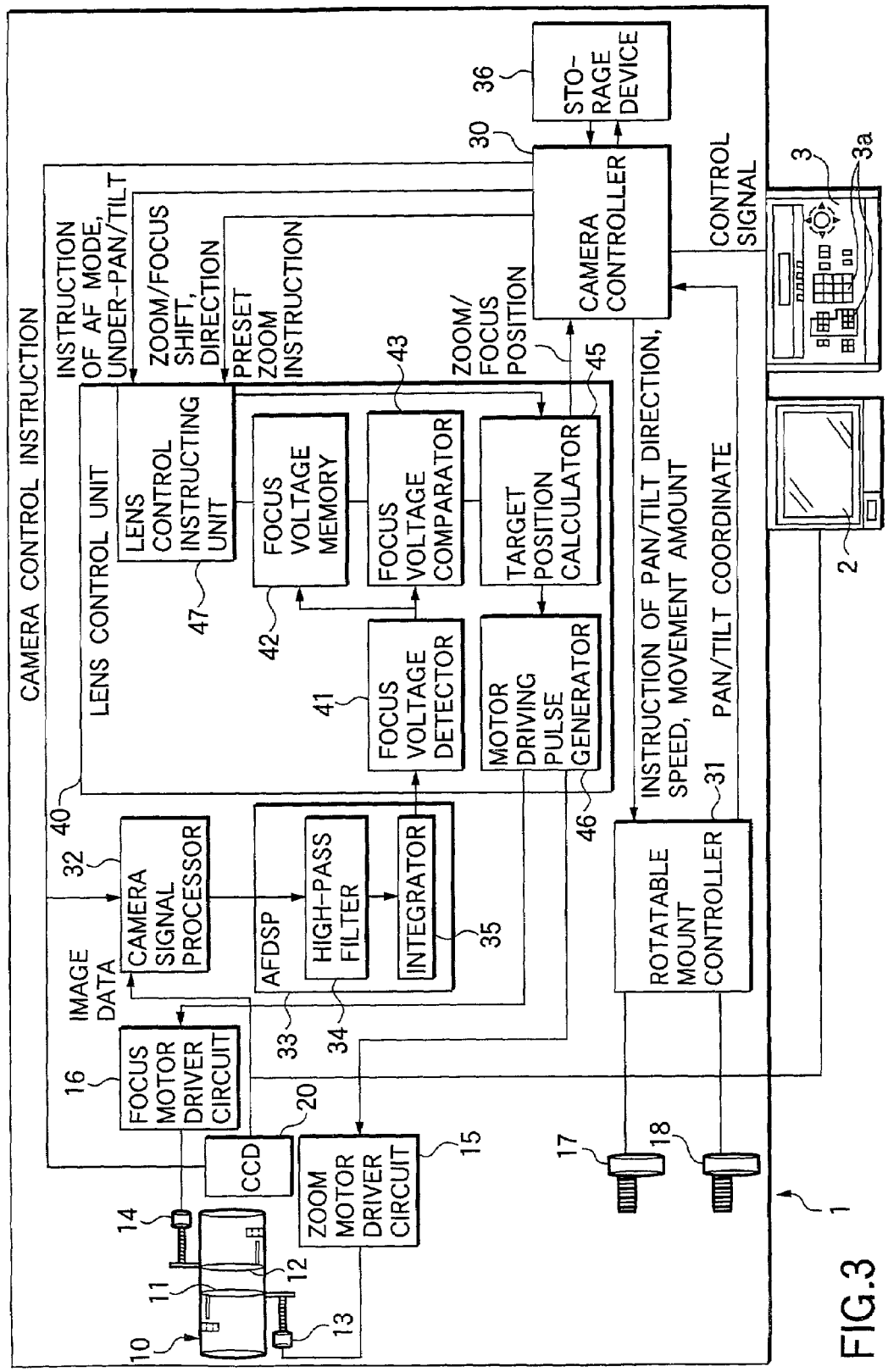
FIG. 3 is a diagram showing the construction of the imaging device according to the embodiment of the present invention.

FIG. 3 is a diagram showing the internal construction of the camera 1 described above. The camera lens system 10 of the camera 1 has a zoom lens 11 and a focus lens 12. The position of the zoom lens 11 in a lens barrel is moved forwardly/backwardly (the direction approaching to the object is defined as "forwardly" and the direction approaching to the image pickup element is defined as "backwardly") by a zoom motor (stepping motor) 13, and the position of the focus lens in the lens barrel is moved forwardly/backwardly by a focus motor (stepping motor) 14. The zoom motor 13 is supplied with driving power from a zoom motor driver circuit 15, and the focus motor 14 is supplied with driving power from a focus motor driver circuit 16.

In the camera 1, a pan motor 17 for driving the pan mechanism (rotatable mount) 1a shown in FIG. 2 and a tilt motor 18 for driving the tilt mechanism (not shown) are equipped.

An electrical control system of the camera 1 includes a camera controller 30 for outputting various kinds of control signals in response to manual operation instructions from the controller 3, a rotatable mount controller 31 for controlling the pan motor 17 and the tilt motor 18 on the basis of an instruction from the camera controller 30, a camera signal processor 32 for receiving video data signals output from the image pickup element 20 and outputting the data on the basis of an instruction from the camera controller 30, AFDSP (Auto Focus Digital Signal Processor) 33 for processing the video data signals output from the camera signal processor 32 and outputting the voltage corresponding to the degree of the focus positioning, a lens controller 40 for outputting driving pulse signals to the zoom motor driver circuit 15 and the focus motor driver circuit 16 on the basis of the control instruction from the camera controller 30 and the output signal from AFDSP 33, and a storage device 36 for storing the pan/tilt present position output from the rotatable stand controller 40 and the zoom/focus present position output from the lens controller 40 in response to a preset memory instruction from the controller 3.

The rotatable mount controller 31 generates control signals based on a pan direction instruction, a tilt direction instruction, moving speed instructions of both the pan and tilt directions and movement amount instructions of both the pan and tilt directions output from the camera controller 30 to control the pan motor 17 and the tilt motor 18, thereby controlling the rotational angle in the direction of an arrow A and the depression angle in the direction of the arrow B shown in FIG. 2.

The video data signals output from the image pickup element 20 disposed at the focus position of the camera lens system 10 are output to the monitor 2, and also taken into AFDSP 33 through the camera signal processor 32. AFDSP 33 outputs the integration value of the high-frequency components of the video data signals thus taken, and it has a high-pass filter 34 for extracting the high-frequency components from the video data signals, and an integrator 35 for integrating the high-frequency components thus extracted. As the output value of the integrator 35 is larger, that is, the amount of the high-frequency components is larger, a shaper image in focus can be achieved on the screen. Therefore, the voltage corresponding to the output of the integrator 35 is called as "focus voltage".

The lens controller 40 includes focus voltage detector 41 for detecting the output of the integrator 35, a focus voltage memory 42 for storing the focus voltage value before the lens is moved, a focus voltage comparator 43 for comparing the present detection value of the focus voltage detector 41 with the content of the focus voltage memory 42 (previous detection value), a target position calculator 45 for calculating the movement target position of the lens in accordance with the output of the focus voltage comparator 43, a motor driving pulse generator 46 for generating pulses to move each of the focus lens 12 and the zoom lens 11 by only the amount corresponding to the difference between the movement target position of each of the focus lens 12 and the zoom lens 11 output from the target position calculator 45 and the present position and outputting the pulses thus generated to each of the driver circuits 16, 15, and a lens control instructing unit 47.

The purpose of comparing the focus voltages before and after the movement of the lens in the focus voltage comparator 43 is to move the focus lens 12 in the increasing direction of the focus voltage and achieve focus, thereby performing a focus position search based on a well-known so-called climbing method.

The lens control instructing unit 47 controls the lens controller 40 in response to a control instruction from the camera controller 30, and outputs instructions to perform the zoom operation, the focus operation, AF, preset zoom and the focus operation.

When a preset instruction is output from the controller 3 and the camera controller 30 specifies the zoom and focus positions which have been already stored and makes a preset movement request to the lens control instructing unit 47, the lens control instructing unit 47 of this embodiment calculates the mutual relation value between the zoom lens position and the focus lens position as described in detail later, and performs the position control of the focus lens simultaneously with and in conformity with the movement of the zoom lens, whereby object images in focus can be picked up at all times during zooming.

The preset position described above means a position that is predetermined as a monitoring target (a position at which the distance from the camera to the object is determined, such as the position of a prescribed window, the position of a prescribed door or the like), and it is arbitrarily preset by a user of the monitoring camera system. When a surveillant instructs and inputs a prescribed preset position from the controller 3, the pan movement and the tilt movement are made so that the camera 1 is trained on the monitoring target. If the set zoom lens position is nearer to the tele-side than the present value, an image achieved by zooming in the monitoring target is displayed on the monitor 2. According to this embodiment, images under zoom-in operation are also displayed as images in focus on the monitor 2 at all times.

Figure 4:
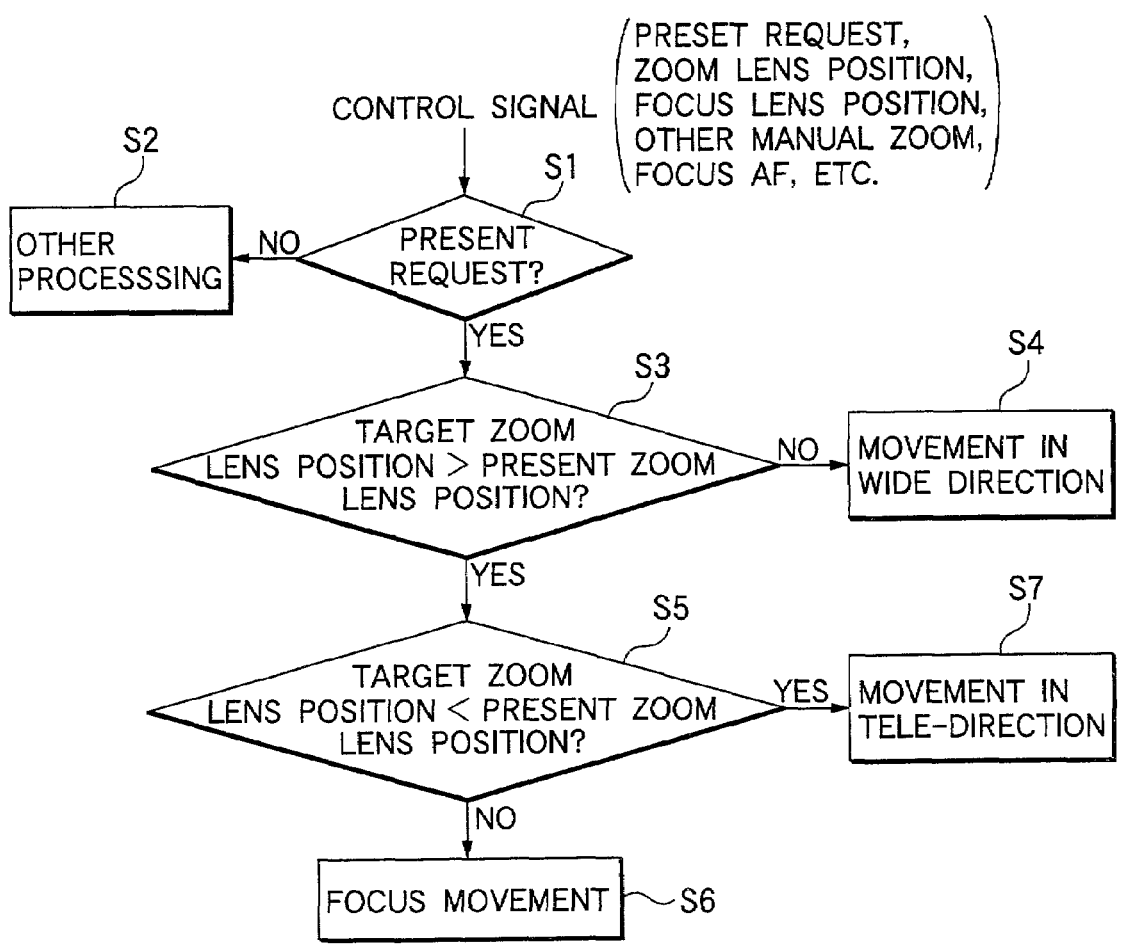
FIG. 4 is a flowchart showing the processing procedure executed in the imaging device according to the embodiment of the present invention.

FIG. 4 is a flowchart showing the processing procedure of controlling the lens controller 40 by the lens control instructing unit 47 in response to the control signal from the camera controller 30. Upon receiving the control signal from the camera controller 30, the lens control instructing unit 47 first judges in step S1 whether the control signal contains a preset movement instruction which is an instruction to quickly move the lens to a preset position. If there is no preset movement instruction, the processing goes to step S2 to carry out other processing.

If it is judged as a result of the judgment in step S1 that the instruction is the preset movement instruction, the processing goes to the next step S3 to judge whether it is an instruction to make the zoom lens 11 zoom in to the telescope side (tele-side). If the judgment result is negative (N), that is, if the instruction is an instruction of zooming to the wide side, the processing goes to step S4 to carry out the zooming operation in the wide direction and then the processing of FIG. 4 is finished.

In the case of the zooming in the wide direction, the object image in focus can be achieved irrespective of the distance to the object at all times by merely moving the focus lens according to the tracking curve. The zooming in the wide direction according to this embodiment will be described later.

It the judgment result of the step S3 is positive (Y) and the judgment result of the step S5 is positive (Y), the instruction is the zoom-in instruction to the tele-side and thus the processing goes to step S7 to carry out the zoom-in operation in the tele-direction according to the lens driving method which is the feature of the present invention. If the judgment is negative (N) in step S5, no zooming movement is made. Therefore, the processing goes to step S6 to make only the focusing movement.

Figure 1:
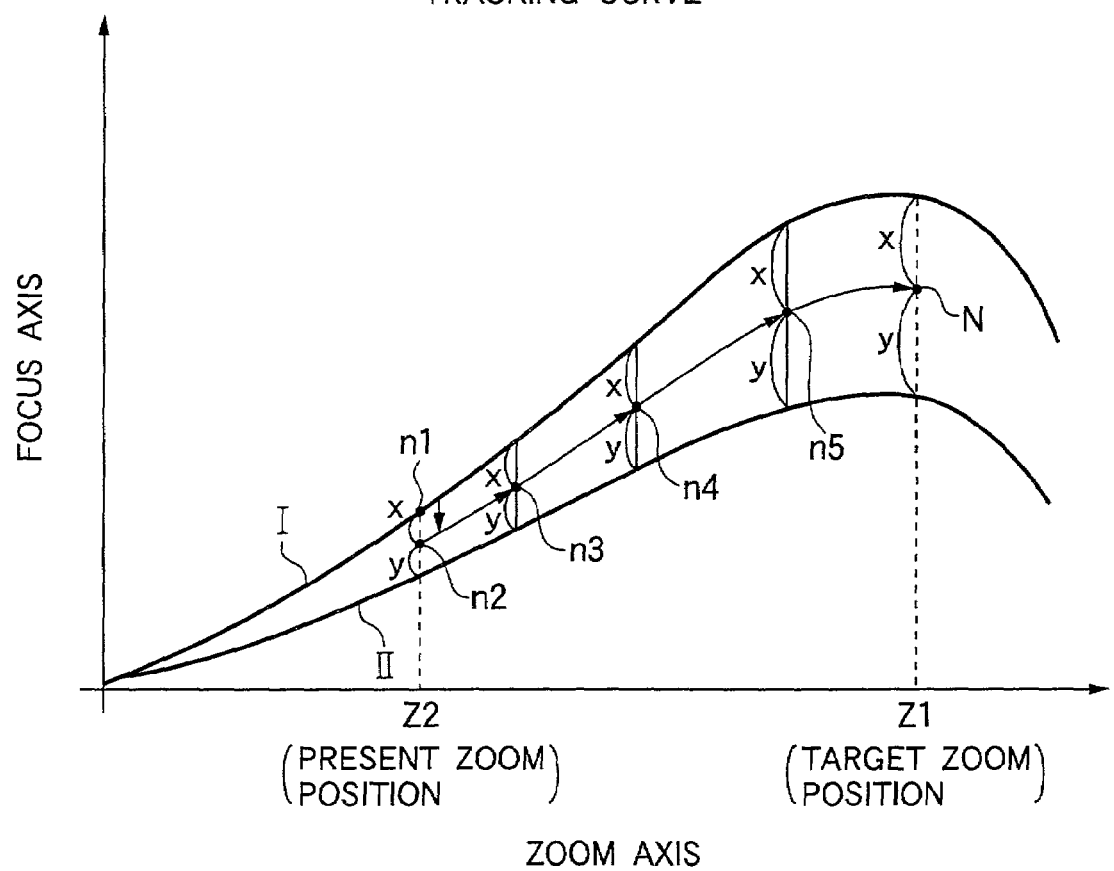
FIG. 1 is a diagram showing a lens driving method for an imaging device according to an embodiment of the present invention.
Figure 5:
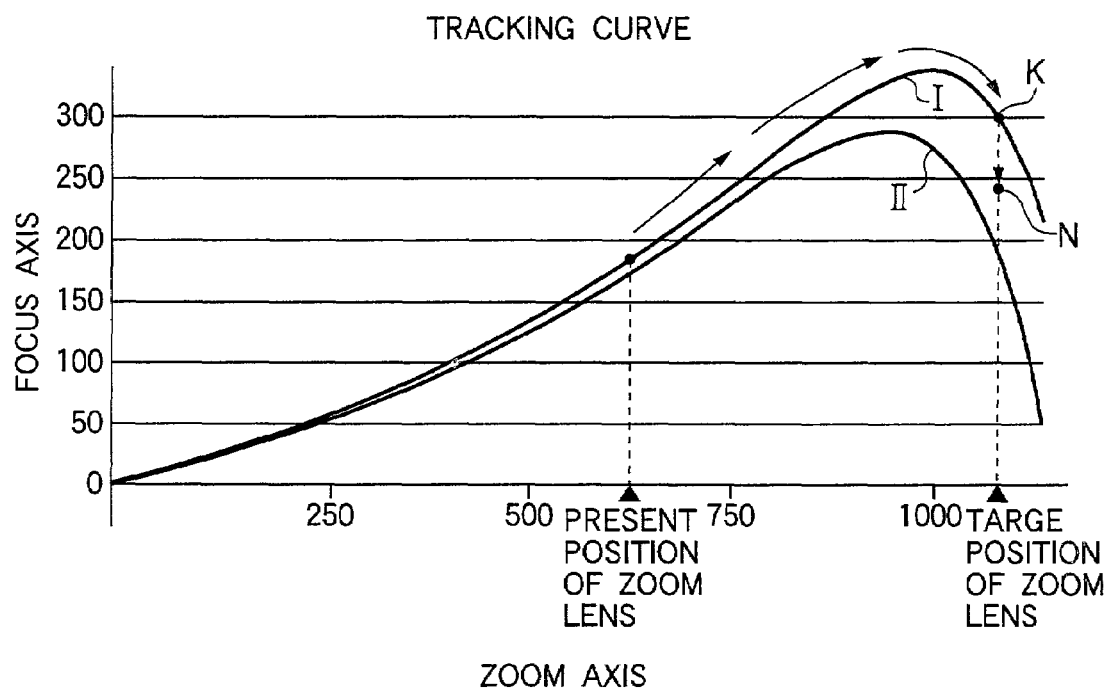
FIG. 5 is a diagram showing tracking curves to explain a conventional lens driving method.

FIG. 1 is a diagram showing the tracking curve with which the lens driving method according to this embodiment will be described. The actual tracking curve is similar to that of FIG. 5, however, the gap between the two tracking curves is illustrated as being exaggerated in FIG. 1 for convenience of explanation.

According to this embodiment, when the zoom-in operation is conducted on an object at the preset position, the distance to the object is first calculated from the coordinate value of a lens preset arrival target position. That is, the distance to the object (for example, the distance from the camera 1 to the monitoring target "window") can be determined through the calculation based on the zoom lens position and the focus lens position memorized and the tracking curve described above, and thus the distance to the monitoring target specified by the controller 3 can be determined.

The tracking curve I shown in FIG. 1 is a tracking curve having a focus distance of 1.6 m, and the tracking curve II is a tracking curve having an infinite focus distance. Therefore, the interior division ratio (x:y) between both the tracking curves at the position N of the focus distance "5 m" of the target zoom position Z1 is calculated. The value of the interior division ratio corresponds to the mutual relation value between the tracking curve and the focus position in this embodiment. The same interior division ratio (x:y) position n2 at the present zoom position Z2 is calculated. This calculation is carried out by a target position calculator 45 on the basis of an instruction from the lens control instructing unit 47 shown in FIG. 3.

Subsequently, the focus lens position n1 at the present zoom position Z2 is moved to the position n2 of the interior division ratio (x:y) between both the tracking curves. According to the zoom-in operation of the zoom lens, the positions n3, n4, n5 of the interior division ratio (x:y) are successively calculated, and the focus lens position is shifted to each position, whereby the focus lens position is finally set to the position N.

By moving the focus lens in the manner described above, object images in focus can be picked up at all times even during the zoom-in operation of the zoom lens, and thus the picked up images can be displayed on the monitor 2. Further, it is unnecessary to make the movement of the focus lens from the position K to the position N described with respect to the conventional art. Therefore, the zoom-in processing speed can be increased, and further the total movement amount of the focus lens can be reduced, so that the lifetime of the lens driving system can be enhanced.

Further, according to this embodiment, in the case of the zooming operation in the wide direction in step S4 of FIG. 4, the internal division ratio (x:y) between both the tracking curves at the focus lens position N of the start position Z1 when the zooming in the wide direction is started is calculated, the focus lens is shifted in the following order: the position N→n5→n4→n3→n2 while keeping the same internal division ratio (x:y) and the focus lens is finally shifted to a reference position n1. By switching the tracking method between the tele-direction and the wide direction as described above, the object image under the extremely excellent focus condition can be achieved even during zooming in both the tele-direction and the wide direction.

According to the present invention, there is provided a lens driving method for an imaging device with which the object image picked up during zooming is an image in focus at all times.

What is claimed is:

1. A lens driving method for an imaging device comprising:
providing a focus lens located at an initial position;
storing a preset position as a predetermined monitoring target, based on an input by a user, and prior to beginning a zoom operation,
   wherein the step of storing includes storing a focus lens position of the preset position, storing a zoom lens position of the preset position, and storing at least one of a pan position and a tilt position, wherein the focus lens position of the preset position and the zoom lens position of the preset position are final lens positions of the zoom operation;
controlling position of the focus lens so as to be interlocked with the zoom operation to pick up an object image in focus even during the zoom operation by determining an interior division ratio (x/y) for a focusing point between a first tracking curve (I) and a second tracking curve (II), respectively corresponding to a first focusing distance and a second distinct focusing distance, and by controlling a position of said focus lens to keep a mutual relation value according to said interior division ratio (x/y), between a position of a zoom lens and said position of said focus lens with respect to the first and second tracking curves, when the object image located at the preset position is subjected to the zoom operation by said zoom lens,
wherein for said imaging device to zoom up said object image located at said preset position at a target magnification by said zoom lens, said interior division ratio (x/y) is determined for the preset position using said focus lens position of the preset position, which is stored during the step of storing prior to beginning the zoom operation and which is a final lens position of the zoom operation;
performing at least one of a pan operation based on the pan position and a tilt operation based on the tilt position; and
beginning and performing the zoom operation, subsequent to determining the interior division ratio (x/y) for the preset position using said focus lens position of the preset position, to move the focus lens from the initial position to said focus lens position of the preset position and to zoom up said object image located at said preset position.

2. The lens driving method according to claim 1, wherein for said imaging device to zoom up said object image located at said preset position in a wide direction by said zoom lens, said interior division ratio (x/y) is determined for a focus point position of the object image at a target zoom position (Z1) in a wide direction.

3. An imaging device comprising:
a camera lens having the zoom lens and the focus lens; and
a control unit operable to control position of said focus lens to be interlocked according to the lens driving method of claim 1 with the zoom operation to pick up the object image in focus even during the zoom operation when the object image is subjected to the zoom operation by said zoom lens.

4. The imaging device of claim 3, wherein said control unit is further operable to determine a focus point position of the object image at a zoom position of the target magnification and to determine the mutual relation value between tracking curves and the focus point position when the object image located at the preset position is zoomed up at the target magnification by said zoom lens.

5. An imaging device of claim 3, wherein said control unit is further operable to determine the mutual relation value between a focus point position of the object image and tracking curves when the object image located at the preset position is zoomed in a wide direction by said zoom lens.

6. A camera system comprising:
a imaging device as claimed in claim 3;
a monitor for displaying an image from said camera lens; and
a controller connected to said imaging device, said controller outputting an instruction of the zoom operation to said imaging device upon input of the zoom operation.

* * * * *